United States Patent [19]

Radd et al.

[11] 4,452,325

[45] Jun. 5, 1984

[54] COMPOSITE STRUCTURE FOR CUTTING TOOLS

[75] Inventors: Frederick J. Radd; Elard L. Haden, both of Ponca City, Okla.

[73] Assignee: Conoco Inc., Ponca City, Okla.

[21] Appl. No.: 424,947

[22] Filed: Sep. 27, 1982

[51] Int. Cl.³ .................. E21B 10/00; E21B 10/52
[52] U.S. Cl. ............................ 175/410; 175/409; 175/412; 175/374; 29/447; 51/206 R; 76/108 A; 76/108 R; 76/101 E; 408/144
[58] Field of Search ............... 175/409, 410, 411, 412, 175/374, 379; 51/204, 206 R; 76/108 A, 108 R, 101 E; 408/144, 145; 29/447

[56] References Cited

U.S. PATENT DOCUMENTS

| | | | |
|---|---|---|---|
| 1,522,593 | 1/1925 | Pickin | 76/108 A |
| 1,549,615 | 8/1925 | Schroter | 75/240 |
| 1,721,416 | 6/1929 | Schroter | 75/236 |
| 1,757,601 | 5/1930 | Stoody et al. | 219/146.51 |
| 1,855,330 | 4/1932 | Zublin | 76/103 |
| 1,993,330 | 3/1935 | De Bats | 75/1 |
| 3,120,285 | 2/1964 | Rowley et al. | 175/408 |
| 3,385,683 | 5/1968 | Williams | 51/293 |
| 3,602,620 | 8/1971 | Fassler | 29/447 |
| 3,835,598 | 9/1974 | Tobey | 51/204 |
| 3,879,901 | 4/1975 | Caveney | 51/295 |
| 3,972,161 | 8/1976 | Zoiss | 51/206 R |
| 4,063,909 | 12/1977 | Mitchell | 51/309 |
| 4,065,046 | 12/1977 | Roberts et al. | 228/156 |
| 4,116,688 | 9/1978 | Kaarlela | 75/229 |
| 4,128,971 | 12/1978 | Dunnington et al. | 408/145 |
| 4,262,761 | 4/1981 | Crow | 175/374 |
| 4,295,885 | 10/1981 | Kaarlela | 75/208 |
| 4,299,297 | 11/1981 | Lloyd | 175/410 |

FOREIGN PATENT DOCUMENTS

| | | | |
|---|---|---|---|
| 123897 | 4/1947 | Australia | 51/206 R |
| 576757 | 4/1946 | United Kingdom | 51/206 R |

Primary Examiner—William F. Pate, III
Assistant Examiner—Mark J. DelSignore
Attorney, Agent, or Firm—Stephen A. Littlefield

[57] ABSTRACT

A cutting tool comprises a compact bundle of elongated, substantially cylindrical fibers or rods formed from a cemented metal carbide material. The bundle of fibers is shrink-fitted within a metal collar to form a long-wearing cutting tool.

6 Claims, 5 Drawing Figures

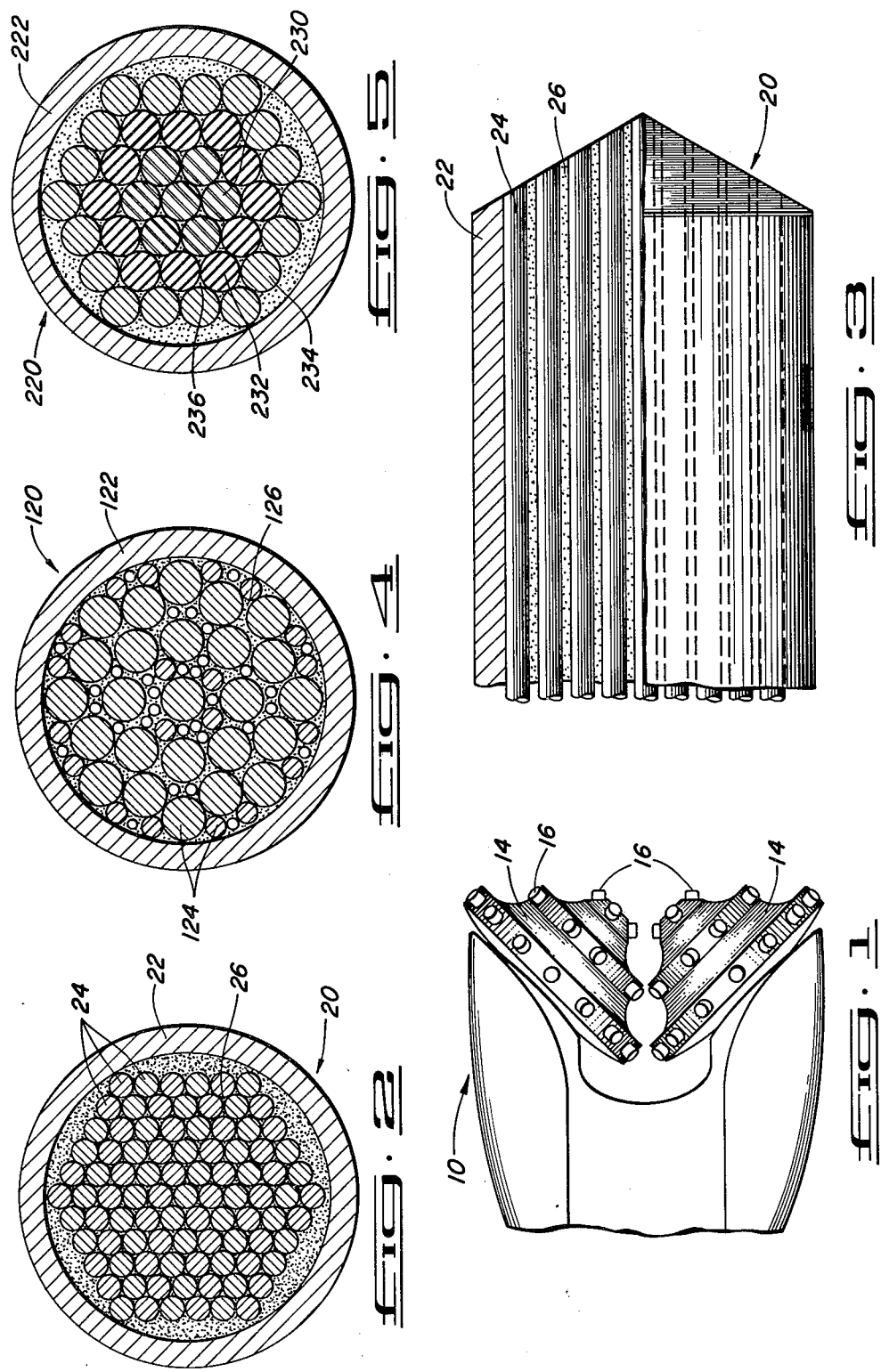

COMPOSITE STRUCTURE FOR CUTTING TOOLS

This invention relates to the art of cutting tools and more particularly to the composite structure which finds use in the cutting portions of a rock drill bit, coal pick and the like.

BACKGROUND OF THE INVENTION

The following shall constitute a prior art statement under the guidelines as set forth in 37CFR Sections 1.56, 1.97 and 1.98.

The fabrication of tools for cutting, crushing or breaking hard materials such as rock has long been a problem. Many materials which are hard enough to successfully abrade rock formations such as metal carbides, silicides, borides, tellurides and the like are difficult to use because, despite their high hardness, they are extremely brittle and easily shattered upon impact.

In an attempt to overcome the difficulties associated with the brittleness of these hard abrasive materials, it has become common to form particulate hard abrasive material in a matrix of a softer, tougher metal. Thus, U.S. Pat. Nos. 1,549,615, 1,721,416 and 1,993,598, describe processes whereby various hard abrasive particulate materials such as tungsten carbide are cemented in a composite containing up to about 20% of a softer, tougher metal such as iron, nickel and/or cobalt. Such composites are then utilized directly for the cutting or abrading faces of a tool such as a drill bit as described in U.S. Pat. No. 3,120,285 or an abrasive compact such as described in U.S. Pat. Nos. 3,879,901 and 4,063,909. Alternatively, welding rods have been formulated either of a cemented hard abrasive material or incorporating metal powders which will form a cemented hard abrasive material in the weld arc to deposit the cemented, hard abrasive material on the desired surface of a cutting tool such as described in U.S. Pat. Nos. 1,757,601 and 3,385,683.

Erosion of the softer metal with the consequent spalling of the hard abrasive particles has led to the development of cutting and abrasive tools which utilize filamentary or rod-like forms of hard abrasive material on cutting tool surfaces. Thus, an abrasive hone is disclosed in U.S. Pat. No. 3,972,161, in which cylindrical fibers of hard abrasive materials such as metal nitrides, carbides and borides are oriented parallel to each other and generally perpendicular to the honing surface with a surrounding matrix of wearable material. Similar structures are disclosed in U.S. Pat. Nos. 4,116,688 and 4,295,885.

In a similar manner, U.S. Pat. Nos. 1,855,330 and 4,262,761, describe the use of tungsten carbide rods embedded in the cutting edges of a cutting tool such as a rock bit tooth. When a portion of the brittle tungsten carbide rods are broken off, the surrounding material wears down to expose the broken end of the rod which then continues the cutting process until further broken and finally worn away completely.

U.S. Pat. No. 4,299,297, describes a rotary percussion bit having a plurality of raised cutting elements. The cutting elements comprise discs of hard abrasive material embedded in a tougher, softer wearable filler material disposed within rings of metal which are attached to the face of the rotary percussion bit. Any impact against the hard abrasive discs of the cutting elements can cause breakage and loss of the abrasive material from the cutting surface.

SUMMARY OF THE INVENTION

The present invention provides a cutting tool utilizing the advantageous properties of hard abrasive materials such as metal carbides while providing a structure which greatly reduces the problem of shattering of these hard, brittle materials during use. The cutting tool of this invention may be used as the point of a coal pick or, in a preferred embodiment of the invention, as an abrasive blank for forming the cutting teeth of a rock drill bit.

In accordance with the invention, a cutting tool comprises a close-packed array of parallel, cemented tungsten carbide filaments which is tightly bound, preferably by shrink fitting into a cylindrical collar of softer, tougher metal material.

Further in accordance with the invention, several sizes of the aforedescribed cemented tungsten carbide filaments are employed to achieve a dense packing of filamentary material with a minimal amount of interstitial spacing between the filaments.

Still further in accordance with the invention, the interstices between the fibers in the aforementioned structure are filled with a wearable material of increased toughness.

In yet another aspect of this invention, the cementation metal content of the cemented metal carbide filaments of the aforedescribed structure is varied, and thereby the wearability of each filament, so that the differential wearability of the compacted bundle results in a profiled exposed end structure and the maintenance of such profile as the cutting tool wears.

In a still further aspect of this invention, a cutting tool comprises a plurality of parallel filaments of cemented metal carbide disposed in a tougher, wearable metal matrix, the cementation metal content of the cemented metal carbide filaments being varied to provide a profiled wear structure, the differential wearability of the filaments acting to maintain the profile of the cutting tool during use.

It is therefore an object of this invention to provide a long wearing cutting tool which utilizes the efficient cutting properties of hard abrasive materials but which avoids the breakage of major portions of the structure common with prior art cutting tools using such hard abrasive materials.

It is another object of this invention to provide a cutting tool which promotes the maintenance of a tool profile as it is worn in use.

BRIEF DESCRIPTION OF THE DRAWINGS

These and other objects of the invention are accomplished through the manner and form of the present invention which will be further described in the more limited aspects of preferred embodiments thereof including a number of parts and arrangements of parts. The preferred embodiments of the invention will be described in conjunction with the accompanying drawings forming a part of this specification and illustrating preferred embodiments of the invention in which:

FIG. 1 illustrates a rock drilling bit in which the cutting tool of the present invention may be used;

FIG. 2 is a cross sectional view of one form of a cutting tool assembled in accordance with a preferred embodiment of this invention;

FIG. 3 is a fragmented, side elevational view of the cutting tool shown in FIG. 2;

FIG. 4 is a cross sectional view of an alternative form of cutting tool in accordance with another preferred embodiment of the present invention, and FIG. 5 is a cross sectional view of another cutting tool in accordance with yet another preferred embodiment of the present invention.

DETAILED DESCRIPTION OF THE PREFERRED EMBODIMENTS AND THE DRAWINGS

Referring now to the drawings wherein the showings are for the purposes of illustrating preferred embodiments of the invention and not for the purpose of limiting same, FIG. 1 shows a rock drill bit 10. The drill bit 10 includes cutting wheels or gears 14 having a plurality of tooth-shaped cutting elements 16 disposed therein. The cutting elements 16 are generally cylindrical in form and are preferably shrink fitted into holes of appropriate size formed in the cutting wheels 14.

In accordance with the invention, cutting elements 16 are formed from a compacted bundle of filamentary hard abrasive materials such as cemented metal carbides encased in a tough metal cylindrical outer casing. FIGS. 2-5 illustrate various embodiments of a cutting tool which may be employed as a blank for forming the cutting elements 16 of a drill bit 10 in accordance with preferred embodiments of the present invention.

FIG. 2 shows a cutting tool 20 having a tubular outer cylindrical collar 22 enclosing a plurality of closely packed, parallel, cylindrical filamentary hard abrasive elements 24. The tubular outer cylindrical collar 22 may be formed of any strong, tough metal such as mild steel, stainless steel, titanium or alloys of any of these materials such as titanium bronze. The cylindrical filamentary hard abrasive elements are preferably cemented, metal carbide filaments such as cobalt-cemented tungsten carbide. It will be understood that metals other than cobalt such as nickel and/or iron may be used as the cementation metal. It will be further understood that while tungsten carbide is preferred, other, similar hard abrasive meterials such as metal carbides, borides, silicides and the like may be used.

As mentioned previously, the parallel cylindrical elements 24 are closely packed so that their outer edges are in tight abutment against the cylindrical outer edges of adjacent filaments. One way to effect this close packing of cylindrical filamentary elements 24 is to shrink fit the tubular outer cylindrical collar 22 around the cylindrical elements 24 so that the close-packed relationship of the cylindrical elements 24 is assured. The figures illustrate the normal, geometric close-packed hexagonal arrangement of circular (cross-section) bodies. For clarity, this hexagonal form is shown in the figures with the side edges of the bundle being straight. It will be understood, however that maximum filling of the volume within the tubular collar 22 is contemplated. It will be further understood that while the tubular collar 22 is described and illustrated as being generally cylindrical in nature, this is a matter of choice for the preferred embodiment. The collar 22 may be of any tubular form including having a square, ovate, hexagonal or other cross sectional shape.

The interstitial space 26 between adjacent cylindrical filamentary hard abrasive elements 24 may be left open, or preferably, the interstitial space 26 may be filled by a filler metal similar to that forming the outer cylindrical collar 22. The filler metal used for completing the structure by filling the interstitial spaces 26, should be a tough, ductile matrix metal such as an alloy steel. Such filler metal would, in the preferred embodiment, have a Rockwell C hardness of about 40 to 50 following heat treatment after assembly of the cutting tool 20.

The filling of the interstitial spaces 26 with a matrix of filler metal may be accomplished by any technique known in the art but is preferably accomplished by wicking molten matrix metal into the interstitial spaces 26. Alternatively, powder metal may be packed into the interstitial spaces 26 and sintered to form the matrix surrounding the cylindrical filamentary hard abrasive elements 24.

FIG. 4 illustrates an alternative embodiment of a cutting tool 120 in which a tubular outer cylindrical collar 122 encases a plurality of variable-sized cylindrical filamentary elements 124 so that there is an even tighter packing of such filamentary elements and a consequent reduction in and near elimination of interstitial spacing between adjacent, abuting filamentary elements 24. As with the embodiment which was previously discussed, the tubular outer collar 122 is preferably shrink-fitted around a bundle of parallel cylindrical filamentary hard abrasive elements 124 so that there is a tight abutment of the filaments. Also, as with the previously discussed embodiment, the interstitial spaces 126 may be either filled or empty as desired but are preferably filled, since greater toughness is afforded to the resultant structure by the filling of the interstitial spaces.

Yet another embodiment of this invention is illustrated in FIG. 5 wherein a cutting tool 220 comprises a plurality of filamentary elements disposed within a tubular outer cooler 222. The filamentary materials used in the cutting tool 220 have a varying content of cementation metals such as cobalt in their structure. Generally, cementation metal is present in the cylindrical filamentary materials in a range of about 5 to about 20% by weight of the total composition. With increasing concentrations of cementation metal, the erosion of the individual fibers increases as well as its toughness or resistance to breakage. However, the abrasive properties of the filamentary material decrease with increasing content of cementation material.

In the preferred embodiment shown in FIG. 5, the central filaments 230 are formed from a material having a low concentration of cementation metal and thus a high abrasiveness and a low resistance to breakage. Outwardly of the central filaments 230, an intermediate ring of filaments 232 encompasses the central filaments 230. The intermediate filaments 232 have a greater content of cementation metal than those inwardly thereof. At the outward edge of the bundle of filamentary materials, filaments 234 of even higher content of cementation metal form a ring of filaments surrounding those of lower cementation metal content (230, 232) located radially inward thereof.

With the preferred cobalt-cemented tungsten carbide filaments of this invention, the central filaments 230 would have a cobalt content of about 6% while the intermediate filaments 232 would have a cobalt content of about 9% and the outer filaments 234 would have a cobalt content of about 12%. This form of radial variation of the cobalt content promotes a wear profile which is conically-pointed. It will be understood that these gradations and percentages are presented only for the purposes of illustration. Also, more or less than three gradations of cementation metal content may be employed, the overall effect being that the cementation metal content increases radially outwardly of the center of the cutting tool 220. It will be readily apparent that while radial variation of the cementation metal content is illustrated, other, more complex variations can be used to promote different wear profiles to the end of the cutting tool 220.

As with the other embodiments, the cutting tool 220 may have its interstitial spaces 236 either filled or unfilled as previously described. Also, the parallel-orinted bundle of filamentary materials 230, 232, 234 may be tightly compressed and shrink-fitted within a cylindrical outer collar 222 of the cutting tool 220.

Alternatively, a unified body of matrix material may be used to bind and surround the parallel, filamentary cemented hard abrasive materials of variable cementation content. In such an embodiment, the complete structure would be cast, hot pressed, extruded or otherwise formed into a unified cutting tool blank without the use of a surrounding collar such as described with respect to the prior-illustrated embodiments. As with the embodiment described with respect to the drawings as shown in FIG. 5, the use of the filamentary material of differing cementation metal content would promote a desired wear profile which may be selectively engineered by those skilled in the art for the particular purpose for which the cutting tool is intended.

The cutting tool in accordance with any of the aforementioned preferred embodiments may be employed in any of various drill bits, coal picks or any other like tool which is employed to abrade or break hard structures such as rock formations. In use, the cutting tools 20, 120, 220 of this invention are preferably shrink-fitted into an appropriately sized hole formed for this purpose in a drill bit gear wheel, coal pick blade or other similar tool.

The cutting tool of this invention affords the advantage of longer wear life since compressive or shearing impact against one portion of the cutting tool will cause breakage of only one or a few of the filamentary materials making up its structure rather than the breakage of the entire cutting tool itself as is common with prior, solid cutting tools such as drill bit blanks, coal picks and the like.

While the invention has been described in the more limited aspects of the preferred embodiment thereof, other embodiments have been suggested and still others will occur to those skilled in the art upon the reading and understanding of the foregoing specification. It is intended that all such embodiments be included within the scope of the this invention as limited only by the appended claims.

Having thus described my invention, I claim:

1. An abrasive impact cutting tool comprising a bundle of elongated, parallel filamentary cemented metal carbide rods and a tubular metal collar surrounding said bundle, said bundle being in a tight-fitting, close-packed relationship of said rods, each of said rods having an outer surface, a portion of said outer surface being in abutment against a portion of the outer surfaces of a plurality of adjacent rods, said bundle being shrink-fitted within said collar.

2. The cutting tool as set forth in claim 1 wherein said cemented metal carbide rods are cobalt-cemented tungsten carbide.

3. The cutting tool as set forth in claim 1 wherein said rods have a variable diameter.

4. The cutting tool as set forth in claim 2 wherein a variable amount of cobalt is present in the plurality of rod members making up said bundle.

5. An abrasive impact cutting tool comprising a bundle of elongated, parallel, filamentary, cemented metal carbide rods in a softer, tougher metal matrix, said elongated, parallel, filamentary, cemented carbide rods having a variable content of cementation metal, each of said rods having an outer surface, a portion of said outer surface being in abutment against a portion of the outer surfaces of a plurality of adjacent rods, said rods being bundled so as to promote profiled wear of the cutting tool.

6. The cutting tool as set forth in claim 5 wherein said cemented metal carbide rods are cobalt-cemented tungsten carbide and said matrix metal is a steel alloy.

* * * * *